US007949104B1

(12) United States Patent
Tuttle (10) Patent No.: US 7,949,104 B1
(45) Date of Patent: *May 24, 2011

(54) MESSAGE DELIVERY SYSTEM WITH ECHO-CANCELLATION

(75) Inventor: Robert J. Tuttle, Ormond Beach, FL (US)

(73) Assignee: The Broadcast Team, Inc., Ormond Beach, FL (US)

( * ) Notice: Subject to any disclaimer, the term of this patent is extended or adjusted under 35 U.S.C. 154(b) by 1182 days.

This patent is subject to a terminal disclaimer.

(21) Appl. No.: 11/638,604

(22) Filed: Dec. 13, 2006

Related U.S. Application Data

(63) Continuation-in-part of application No. 09/124,697, filed on Jul. 29, 1998, now Pat. No. 6,324,262.

(60) Provisional application No. 60/079,454, filed on Mar. 26, 1998.

(51) Int. Cl.
*H04M 1/64* (2006.01)
*H00M 3/00* (2006.01)

(52) U.S. Cl. ..................................... 379/69; 379/265.02

(58) Field of Classification Search ................ 379/67.1, 379/88.22, 69, 209.01, 399.01
See application file for complete search history.

(56) References Cited

U.S. PATENT DOCUMENTS

| | | | | |
|---|---|---|---|---|
| 4,356,348 A | 10/1982 | Smith | ........................ | 179/1 MN |
| 4,539,436 A | 9/1985 | Theis | ............................ | 179/6.04 |
| 4,667,065 A | 5/1987 | Bangerter | ..................... | 379/351 |
| 4,692,817 A | 9/1987 | Theis | ............................... | 360/12 |
| 4,941,168 A | 7/1990 | Kelly, Jr. | ........................ | 379/69 |
| 5,371,787 A | 12/1994 | Hamilton | ...................... | 379/386 |
| 5,404,400 A | 4/1995 | Hamilton | ...................... | 379/386 |
| 5,430,792 A | 7/1995 | Jesurum | ........................... | 379/67 |
| 5,444,767 A | 8/1995 | Goetcheus | ....................... | 379/67 |
| 5,559,867 A | 9/1996 | Langsenkamp | .................. | 379/92 |
| 5,581,602 A | 12/1996 | Szlam | .............................. | 379/88 |
| 5,638,424 A | 6/1997 | Denio et al. | ............... | 379/88.18 |
| 5,644,624 A * | 7/1997 | Caldwell | .......................... | 379/69 |
| 5,644,625 A | 7/1997 | Solot | ............................... | 379/88 |
| 5,652,784 A | 7/1997 | Blen | ................................ | 379/67 |
| 5,724,420 A | 3/1998 | Torgrim | ......................... | 379/372 |
| 5,768,358 A | 6/1998 | Venier | ........................... | 379/207 |
| 5,787,151 A | 7/1998 | Nakatsu | .......................... | 379/67 |
| 5,799,066 A | 8/1998 | Joyce | .............................. | 379/88 |
| 5,901,214 A | 5/1999 | Shaffer | .......................... | 379/220 |
| 5,943,410 A | 8/1999 | Shaffer | .......................... | 379/213 |
| 6,208,970 B1 | 3/2001 | Ramanan | ....................... | 704/270 |
| 6,226,360 B1 | 5/2001 | Goldberg et al. | ................ | 379/69 |
| 6,233,319 B1 | 5/2001 | Cox et al. | .................... | 379/88.22 |
| 6,269,151 B1 | 7/2001 | Hanson | ............................ | 379/69 |
| 2001/0008553 A1 * | 7/2001 | Cox et al. | ...................... | 379/67.1 |

* cited by examiner

*Primary Examiner* — Md S Elahee
*Assistant Examiner* — Solomon Bezuayehu
(74) *Attorney, Agent, or Firm* — Brian S. Steinberger; Law Offices of Brian S. Steinberger, P.A.

(57) ABSTRACT

Interactive system for responding to conditions after an answering machine has been detected in an automatic telephone number dialing and announcing system so that realistic sounding recorded messages can be delivered without truncation. The system starts by: placing a telephone call to an answering machine; playing a recorded message onto the answering machine; monitoring the machine for echo cancellation sounds (sounds emanating from the answering machine) while simultaneously playing the message; repeating the playing of said message onto the answering machine while monitoring for echo cancellation sounds; and continuing to play the message until there are no echo cancellation sounds whereby the recorded message is launched unto the answering machine and continues playing the message to completion. If there are greater than three occurrences of echo cancellation sounds. Then the system avoids further resetting steps and proceeds to play the recorded message onto the answering machine without further interruption.

18 Claims, 9 Drawing Sheets

Market Ability  (904) 676-1520
9 Sunshine Blvd  fax  (904) 676-1127
Ormond Beach, FL  32174

RealCall Recap for HBO Free Preview – Phoenix
4/6/98  11:31:49 AM

|  |  | Database | Connection |
|---|---|---|---|
| Total Database Records | 33083 |  |  |
| Total Call Attempts | 37887 |  |  |
| Total Connections: | 27259 | 82.40% |  |
|  |  |  |  |
| Answering Machines | 17930 | 54.20% | 65.78% |
| Human Answers | 9329 | 28.20% | 34.22% |
|  |  |  |  |
| Busy | 183 | 0.55% |  |
| No Answer | 0 | 0.00% |  |
| No Ring | 51 | 0.15% |  |
| Operator Intercept | 3473 | 10.50% |  |
| Time Out | 2043 | 6.18% |  |
| Fax Tone | 64 | 0.19% |  |

Call Details:

Unreachable Records  3588  10.85%
Fax tone, No ring, Operator intercept

Retryable Records  2226  6.73%
Reason:  Busy + No Answer + Time Out

Live Connection Stats:

Number of live connections : 9329
Length of voice file(s) :  30
Length of call (secs)        Number of connects
    0 – 10            362    3.88 %
    11 – 20          1481    15.88%
    21 – 25           448    4.8 %
    26 – 30          7038    75.44%

Figure 5C

MESSAGE DELIVERY SYSTEM WITH ECHO-CANCELLATION

This invention relates to telephone answering systems, and in particular to interactively monitoring conditions after an answering machine has been detected in automatic telephone number dialer systems in order to deliver realistic sounding recorded messages in their entirety without truncation onto the answering machines recorder, and allows for overcoming problems with the premature launching of prerecorded messages so that the message can be launched closer to the time when the answering machine begins recording, and claims the benefit of U.S. Provisional Patent Application 60/189,307 filed on Mar. 14, 2000 and is a—Continuation-In-Part of U.S. application Ser. No. 09/124,697 filed Jul. 29, 1998 now U.S. Pat. No. 6,324,262, which claims the benefit of U.S. Provisional Patent Application 60/079,454 filed on Mar. 26, 1998 by the same assignee and the same inventor of the subject invention.

BACKGROUND AND PRIOR ART

Telemarketers generally attempt to deliver information messages by telephone to live consumers. In the last decade, automatic telephone answering machines have become a popular addition to most home and businesses. Telemarketers are usually reluctant to leave information messages on these answering machines. Thus, it has become more popular than ever for the telemarketers to use computers, which will detect conditions that, an answering machine is receiving the call so that the call can be dropped (hung up). See for example: U.S. Pat. No. 4,356,348 to Smith. These dropped calls can be quite significant when considering the number of answering machines and undelivered information messages that occur.

Attempts have been made over the years to overcome the problems with delivering messages to telephone answering machines. See for example U.S. Pat. Nos. 4,667,065 to Bangerter; 4,941,168 to Kelly, Jr.; 5,371,787 to Hamilton; 5,430,792 to Jesurum et al.; and 5,581,602 to Szlam et al. However, these patents are generally are limited to sensing audio signals generated by the answering machines for the purpose of determining that the call has connected to a machine, (as opposed to a call that connects to a live person) and do not address the problem of when to begin playback of an outgoing recorded message to insure that it is recorded in it's entirety by the answering device Many existing devises designed to deliver a prerecorded message to an answering device commence playing a recorded message based on mistakenly detecting when the "beep" has occurred. Recognizing a "commence recording now beep" signal is a common problem for both automated systems and real callers trying to leave messages on answering machines. Furthermore, these patents do not fully analyze the connected calls in order to utilize preselected delay times to deliver and play recorded messages.

Message delivery systems, which deliver a recorded message to an answering machine, must solve the problem of determining when to "Launch" (begin playback of) the prerecorded message. Conventional systems rely on a timer to determine the moment to begin playback of the recorded message. Typically a timer is initiated once the determination has been made that the call has been answered by a machine. Message delivery systems which rely on timed delivery experience a high percentage of truncation of the recorded message being delivered. This is a result of the system beginning playback of the recorded message BEFORE the answering machine starts recording.

Another serious problem with timer based systems is that many answering machines will "hang up" on the system before the message launches. This is due to a "vox" function in many answering machines, which allows them to stop recording after they detect several seconds of continuous silence. If a timer based system waits too long before launching the message, the called answering machine may have already hung up, before the message playback begins.

SUMMARY OF THE INVENTION

The first objective of the present invention is to provide a computer based system capable of accurately interpreting an answering machine's playback condition so as to deliver prerecorded messages in their entirety (without truncation) onto the answering machine.

The second object of this invention is to provide a system for delivering prerecorded messages onto answering machines to insure the message sounds realistic (non recorded), in that the message is delivered shortly AFTER the answering machine begins recording.

The third object of this invention is to provide a telephone dialing software message delivery system that overcomes leaving messages on machines based on detecting a false "beep" signal.

The fourth object of this invention is to provide a telephone dialing software message delivery system that simultaneously can playback recorded messages while listening to sounds emanating from an answering machine to accurately determine the record condition of the answering machine device RealCall replaces the pre-set timer controls of the prior art devices with an "interactive" logic, where the invention "listens" to the answering machine's outgoing message and waits for a condition suggesting that the answering machine is in "record" mode. RealCall tests for the "record" mode condition by continuing to "listen" to the call for confirmation before starting to launch. As a result, the time interval from the moment the call connects until RealCall "launches" a message is different for each call placed by the RealCall system.

The novel invention is a next level that comes into play after the system has detected whether the received call in the dialer system has reached a live person or an answering machine. Such a system is described in reference to U.S. Pat. No. 5,371,787 to Hamilton, which is incorporated by reference.

A first preferred embodiment of the invention uses dual two tier steps after determining an answering machine has been reached. One two tier approach determines if a solid, i.e. audibly distinct non human tone of at least one second duration is detected in the connected call and then playing the recorded information message only after the tone has been followed by a preselected interval of silence. The other two tier approach determines if silence of at least two seconds is detected in the connected call (in lieu of the indication of a solid non human tone of at least one second duration) and then playing the recorded information message only after another one second interval of silence has been detected. The system allows for the delivery of a complete pre-selected message in a nontruncated form onto the answering machine within approximately two to three seconds of the start of the answering machine's recording step without allowing the machine to cut-off the complete pre-selected message during the recording, so that a user of the answering machine playing the complete pre-selected message believes a human and not a machine initiated the realistic recording. Unlike the limitations in the prior art systems. the novel invention can be used with all types of answering machines such as, but not limited to a tape machine, a digital machine, a pager, a telephone provider voice/memory call machine, and a cellular machine.

The second preferred embodiment uses a different plural step approach after determining an answering machine has been reached. First, the system determines if a solid non human tone of at least one second duration is detected in the connected call and then begins playing the recorded information message. Alternatively, the system determines if silence of at least two seconds is detected in the connected call and then begins playing the recorded information message. In either of the two systems recited above, if there is echo cancellation (audio interference between the echo of the message being recorded by the answering device as "heard" by the system during a full duplex (two way) conversation, and the actual recorded message being played by the delivery system) there is need for the system of this invention. In accordance with this invention there is an automated method of delivering a recorded information message via a telephone dialing system to an automated recorder while simultaneously monitoring the recorder for echo cancellation sounds, comprising the steps of:

(a) placing a telephone call to an answering machine;
(b) playing a recorded information message onto the answering machine;
(c) monitoring the answering machine for echo cancellation sounds while simultaneously playing the recorded message;
(d) restarting step (b) when echo cancellation conditions exist; and
(e) continuing to play the recorded message if there are no echo cancellation sounds, wherein the method overcomes problems with premature launching of the recorded message so that the recorded message can be launched closer to the time when the answering machine begins recording.

Further objects and advantages of this invention will be apparent from the following detailed description of a presently preferred embodiment, which is illustrated schematically in the accompanying drawings.

BRIEF DESCRIPTION OF THE FIGURES

FIG. 5 is a second embodiment flowchart of the dialer placing call and monitoring portion steps 5-7 of the message delivery system invention of FIG. 2 for echo cancellation.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation. An overview of the "Echo Cancellation" capability is as follows. The telephony hardware "listens" to both the outbound channel (in this case the sound of the prerecorded message being played) and the inbound channel (what is being said into the call recipient's telephone) of the full duplex (two way) telephone call. The system listens to what we call the "echo-reference signal"—the signal being played out to a caller—which in the case of this application will be the prerecorded message. Simultaneously, the system listens to the "echo-carrying signal" which is the returned echo coming back from the phone network. The echo cancellation program is designed to compare the echo from the returned incoming signal from the phone network to the original outbound prerecorded message being played. This "echo-canceled" signal would indicate any sound played over the call recipient's telephone while the calling system was playing the prerecorded message. If the echo cancelled signal is silent, the system can assume that the condition of the answering machine is in the record mode. Any noise represented in the echo cancelled signal would indicate that the answering machine was not yet in the recording mode (for example, the answering machine may be playing a series of "beep" tones, or the outgoing message may still be playing a spoken outgoing message after having previously played periods of silence). The subject invention embodies the following logic in applying Echo cancellation capability to determine the precise moment to begin playback of the recorded message so as to ensure that the message is delivered in it's entirety without truncation resulting from beginning playback before the answering machine enters "record" mode. Once the system has determined that the call has been connected to an answering machine, and has determined that the machine has entered "record" mode through the detection of a solid, non human tone (presumably the "beep" tone) or by detecting 2 seconds of continuous silence, the system will begin playback of the prerecorded message. During the first 10 seconds of playback only the system will continuously monitor the echo-reference signal and compare it to the echo-carrying signal. If the echo-cancellation signal generated by this comparison indicates the presence of sound emanating from the called telephone channel (the answering machine), the system will assume that the previous decision that the called answering system had entered "record" mode had been made in error. In this instance the system would stop playback and immediately begin reanalyzing the call. Each time the system "restarts" the monitoring process as a result of "hearing" a sound on the telephone line, the system would update a counter of retries undertaken as the result of echo cancellation occurrences (echo breaks): If echo breaks occur more than 2 times the system would continue playback of the entire message without further echo monitoring and hang up at the playback completion. This would eliminate the possibility of the system restarting the playback repeatedly because of anomalies in the telephone line connection that might cause the echo cancellation features to incorrectly detect sounds that did not in fact emanate from the answering machine (such as extreme noise over the telephone line due to storms or other telephone network conditions).

Alternatively, when the system starts monitoring echo cancellation during playback, the system detects when there is no echo break. during the 10 second echo-cancellation monitoring period. If no echo break occurs, then the system would continue playback of the entire message without further echo monitoring and hang up at the playback completion. Because the echo cancellation versions will ultimately deliver the prerecorded message in it's entirety on the called party's answering machine, the user of the answering machine playing the complete pre-selected message is likely to believe a human and not a machine initiated the realistic message. Although the echo-cancellation system can create premature launching of messages it's further monitoring function corrects for the premature launching, ultimately delivering the message at a point very close to the actual start of the answering machine's recording process.

Figure 1:
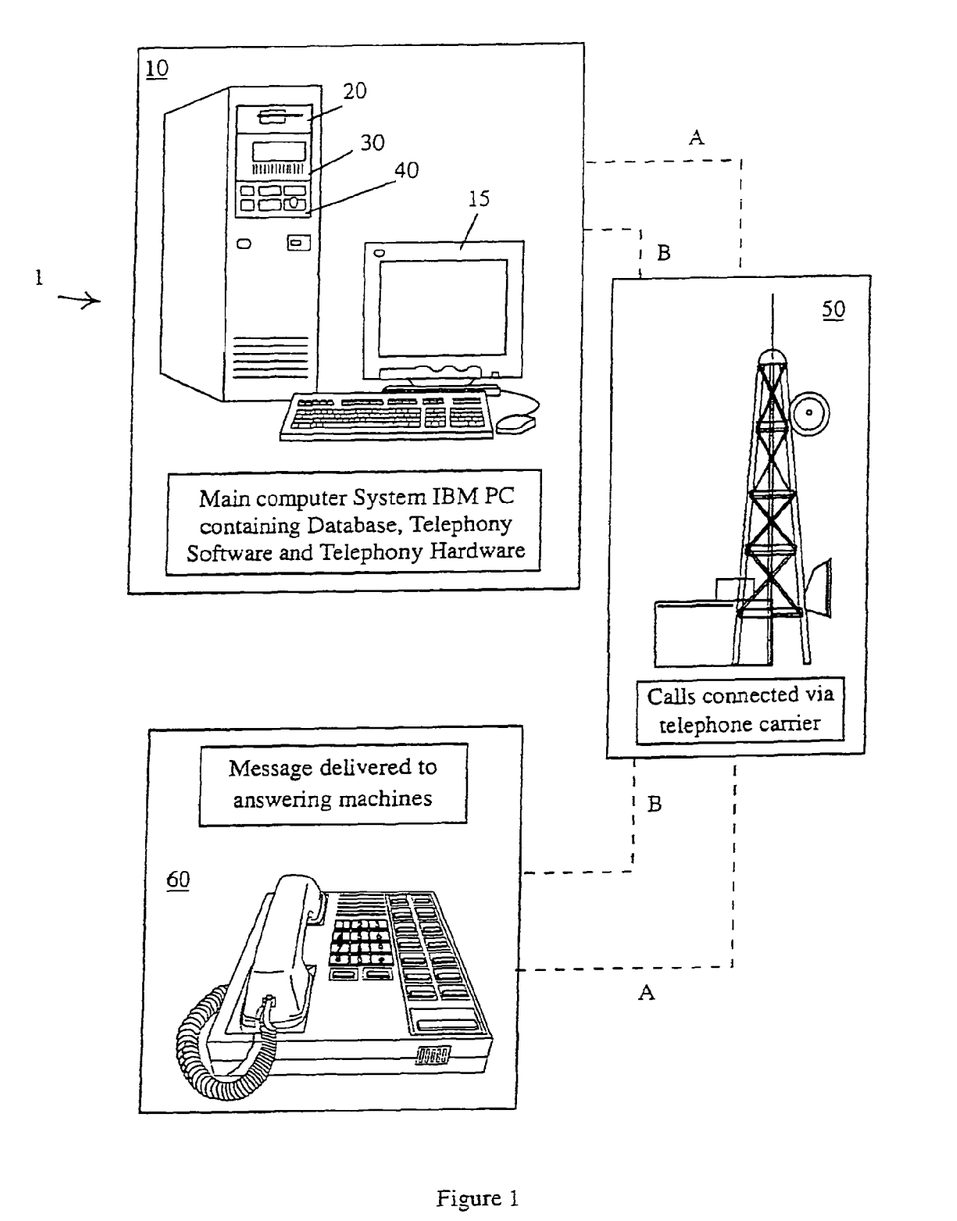
FIG. 1 illustrates a preferred setup of using the novel telephone dialing software message delivery system invention.

FIG. 1 illustrates a preferred setup of using the novel telephone dialing software message delivery system invention. Referring to FIG. 1, the invention, includes a main computer system 10 connected to a telephone carrier 50 which in turn is connected to remotely located answering machines 60. Main computer system 10 includes a PC 15 such as an IBM compatible PC having 200 MHZ or higher, with Pentium processor and the like, including a standard harddrive, 14" or greater color monitor, mouse and keyboard for input PC 15 is connected to a Telephony Hardware 20 such as but not limited to an Analog/Digital Multi Channel Telephony card such as the Dialogic D41D(Analog), D240SC-T1 and D/240SC-T2 (Digital), and the like. The telephony Hardware (CT) 20 can be a computer card used in the computer 10 and includes the following features of playing voice messages to a caller, digitizing and recording voice signals, providing echo-cancellation resources, connecting directly to telephone lines, and placing outbound calls and reporting the results of the calls. The Dialogic Computer Telephony (CT) card model no. D41D, D/240SC-T1 and D/240SC-2T1 can allow multiple telephone lines to operate. The software 30 uses multitasking OS (Windows 2000 or Windows NT or similar), and can be developed with programming language software such as but not limited to C++, Visual Basic, Delphi, and the like. Software 30 further uses Custom Control software for control of the CT hardware 20. Programming languages (i.e. Microsoft's Visual Basic) provide a conduit for programmers to access computers built in capabilities. Programming languages refer to code, which accesses specific capabilities, such as viewing the contents of a hard drive, or playing sound files over a computer's sound card as CONTROLS. The Custom Control software 30 are controls which are not provided as part of the programming language, but are typically developed by third party software developers.

The software 30 further uses database software for maintaining the calling lists, such as but not limited to Microsoft Sequel Server, Dbase, Foxpro, and the like. The calling lists in the RealCall invention contain at least the following: phone number (approximately 10 digits), geographic area indicator (such as ZIP code), message file name(s), call history field, connect time field, record number (unique), date and time of call, and last call status. Although not required, the calling lists can contain additional information such as but not limited to names, addresses, past consumer behavior, and the like.

Along with the telephony CT hardware 20 and software 30 is the telephone service 40 such as but not limited to Analog (RJ11-RJ14) interface, Digital (T1) interface and the like, which comes from the telephone service provider. The telephone service provider, such as but not limited to BellSouth and MCI, provides access to the network of telephone lines linking all telephones across the United States.

A telephone carrier 50 connects automatically dialed calls A from main computer system 10 to deliver messages to the remotely located answering machines 60, and the CT hardware 10 monitors the call status B. For example, BellSouth can provide a "Dial Tone" service, (which can be required by some CT hardware) and MCI can provide digital T1 service (no dial tone). Both BellSouth and MCI can provide a "Switching." capability, wherein each call can be routed over any available wire network to deliver the call to the appropriate telephone.

The subject invention can successfully interpret both traditional answering machines (tape and digital) as well as answering services such as but not limited to BellSouth's "Personal Voice Mail" and "Memory Call" as well as cellular phone answering services such as "Mobile Memo" and pager messaging services. The invention can work with any answering. system which plays a voice message and then records the callers message.

Figure 2:
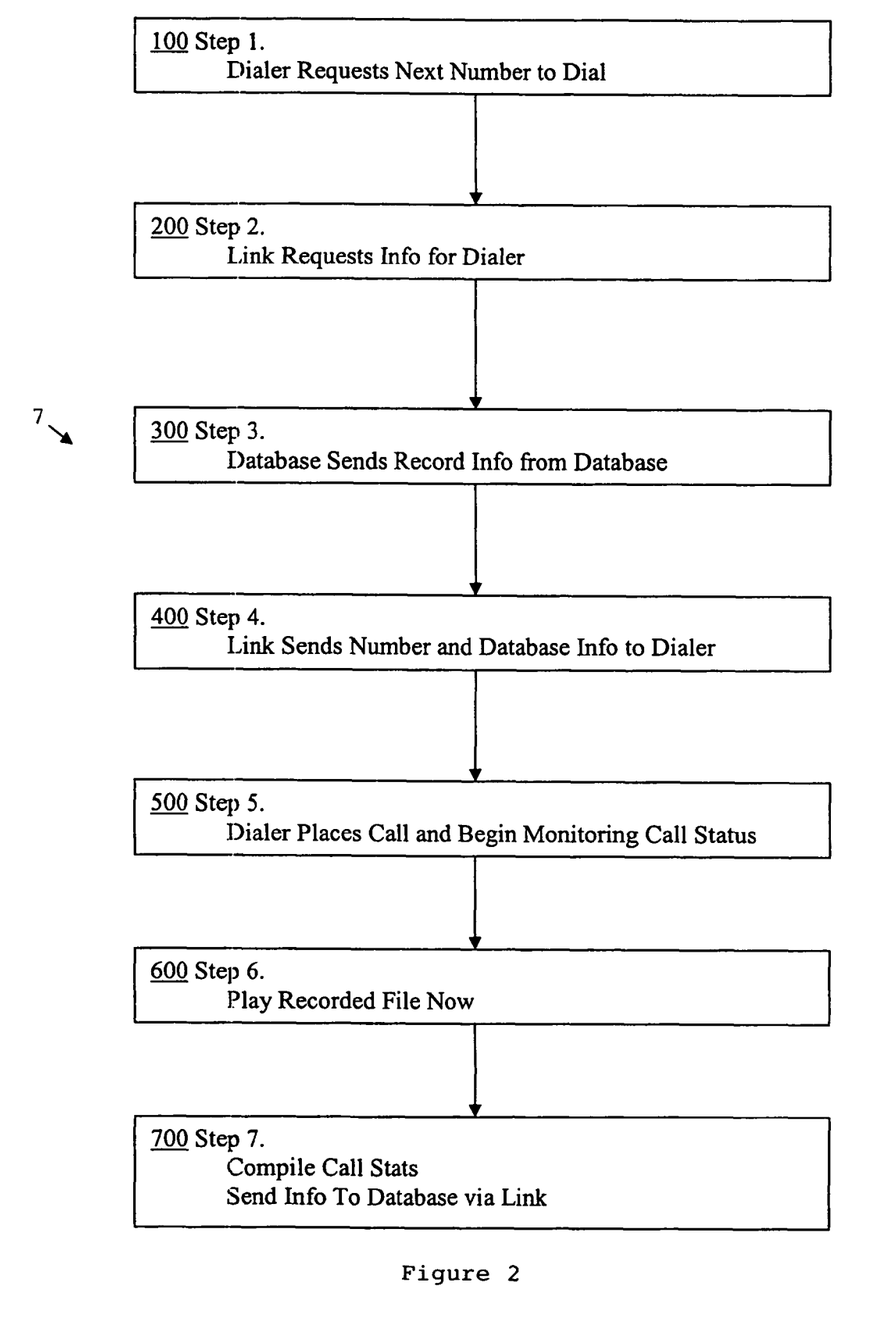
FIG. 2 is a chart of the seven (7) steps used in the novel telephone dialing software message delivery system invention of FIG. 1.

FIG. 2 is a chart 7 of the seven (7) steps used in the novel telephone dialing software message delivery system invention of FIG. 1. The seven (7) steps cover the interaction between a novel dialer program and a link program, which is shown in greater detail in reference to FIGS. 3A-3C. The first four steps can be accomplished by the Dialogic systems covered under U.S. Pat. Nos. 5,371,787 (machine answer detection); 5,638,436 & 5,450,484(voice detection); 4,979,214 (speech recognition); 5,404,400 (out calling apparatus) and 5,764,759, all of which are incorporated by reference. Other dialing systems can be used which initially determine when an answering machine has been detected through step 400.

An overview of the seven (7) steps will now be described. Referring to FIGS. 1 and 2, the first Step 100, the Dialer program requests the next (telephone) number to be dialed from the "Link program" which has access to the calling database in the main computer 10. The "Dialer" step 100 is responsible for dialing a telephone number, determining the status of the call and delivering the recorded message at an appropriate time. For example, each phone line is monitored by the Dialer program step.

In the second Step 200 the Link requests info for the dialer step from a database of phone numbers. A novel Link program insures that individual phone numbers are dialed only once. The Link program is the only program which communicates with the database of phone numbers directly. Each dialer submits requests for new phone numbers to the Link, which processes these requests in the order received and retrieves information from the database of phone numbers on behalf of each dialer program. In addition, the Link program updates the database with completed call statistics which are communicated to the Link program from each Dialer as calls are completed. The purpose of the Link program is to avoid system resource problems which can occur when hundreds of Dialers attempt to simultaneously communicate with a database directly. Third Step 300 has the database send record info from the database to the Link. And the Fourth Step 400 sends the database Info to the dialer.

The subject invention novelty comes into play starting with the Fifth Step 500 in FIG. 2. Fifth Step 500 has the dialer place the call and begins monitoring call status. The call status can include whether the call connected to an answering machine, busy signal, reached a Facsimile tone, no answer, and the like. Sixth Step 600 plays the recorded file, and the seventh Step 700 compiles call stats (statistics) and sends the information to the database in main computer 10 via the Link 50. After a call is completed, the novel program software updates each record with the result statistics (stats) of the call. The stats can include the disposition of the call (delivered to a live person or delivered to an answering machine), length of connect, the call status, the time of day, and the like.

Figure 3A:
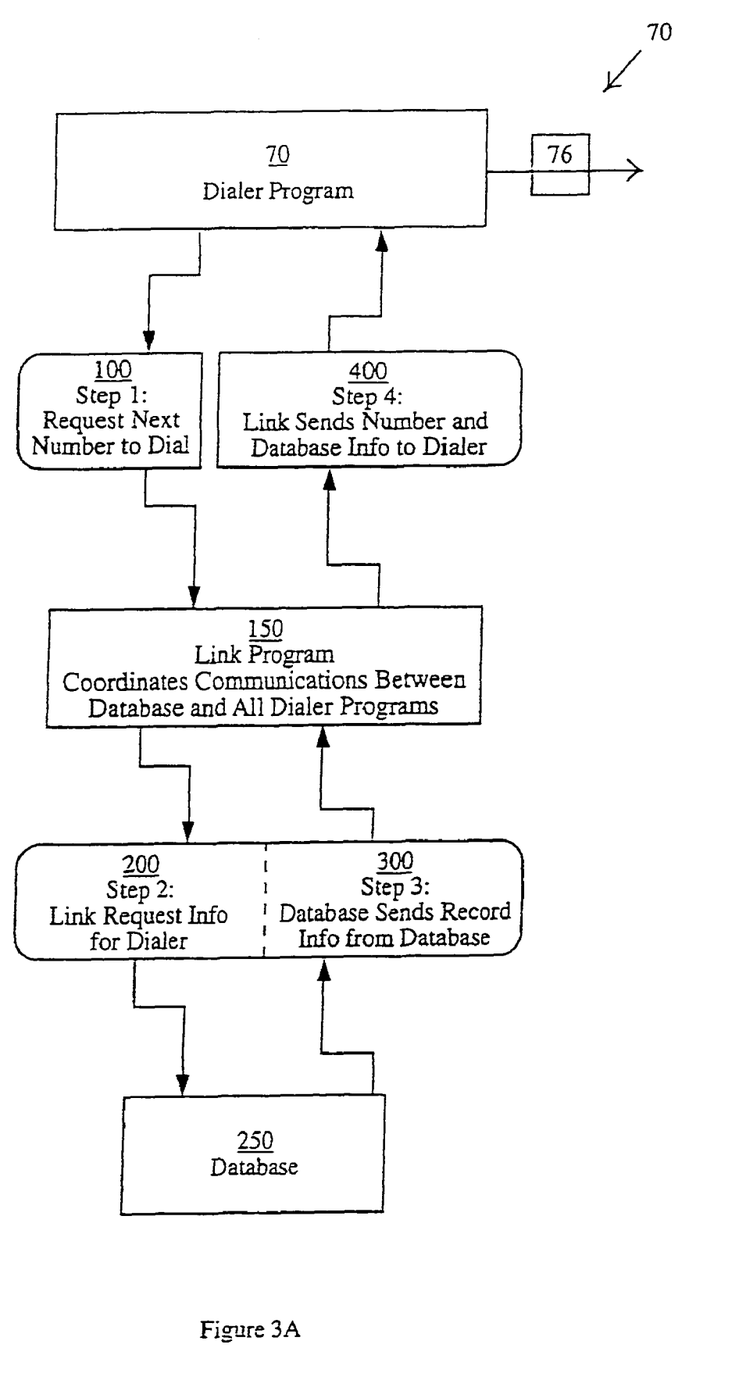
FIG. 3A is a flowchart of the dialer program portion steps 1-4 of the novel telephone dialing software message delivery system invention of FIG. 2.
Figure 3B:
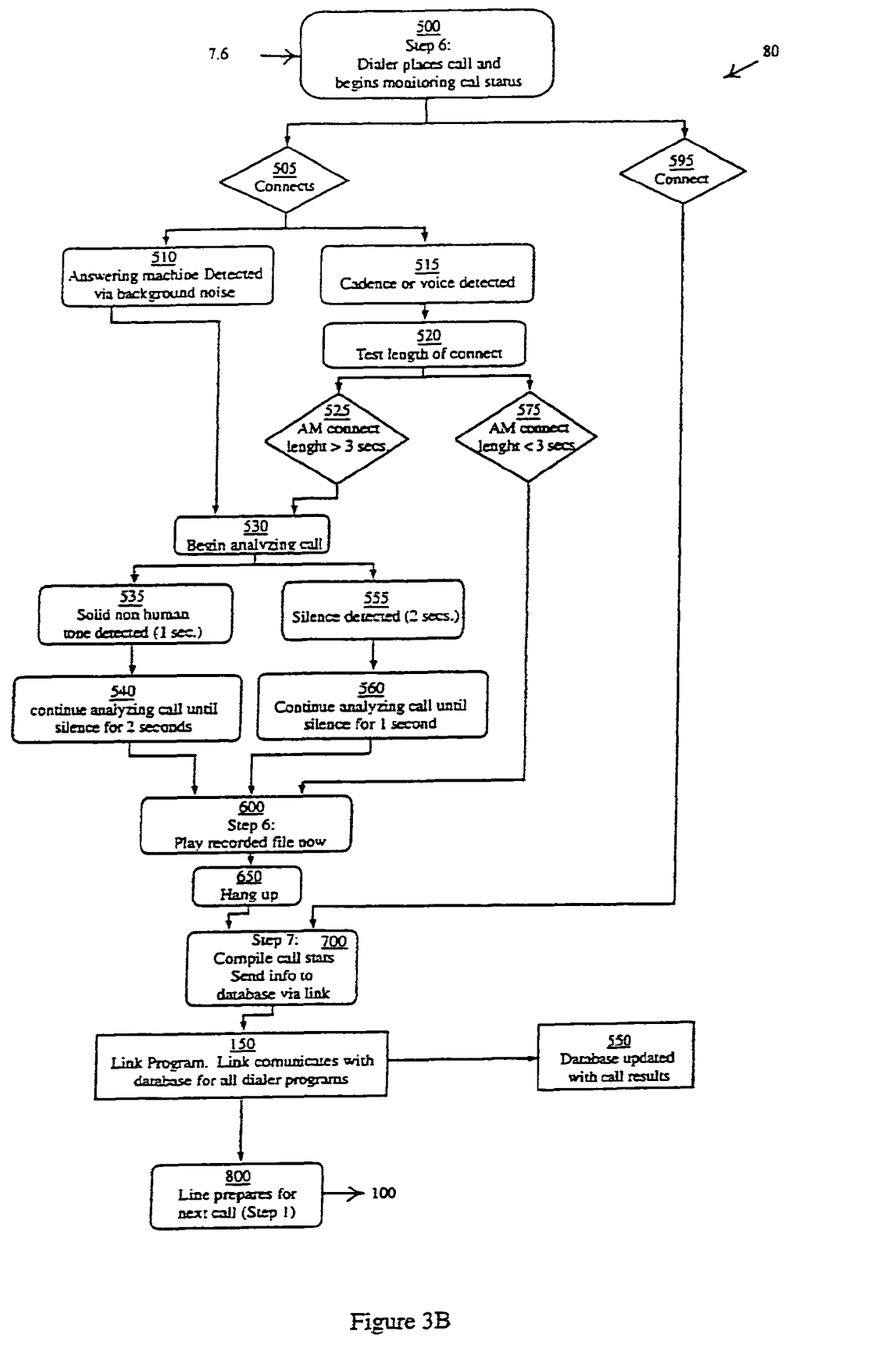
FIG. 3B is a flowchart of the dialer placing call and monitoring portion steps 5-7 of the novel telephone dialing software message delivery system invention of FIG. 2.
Figure 3C:
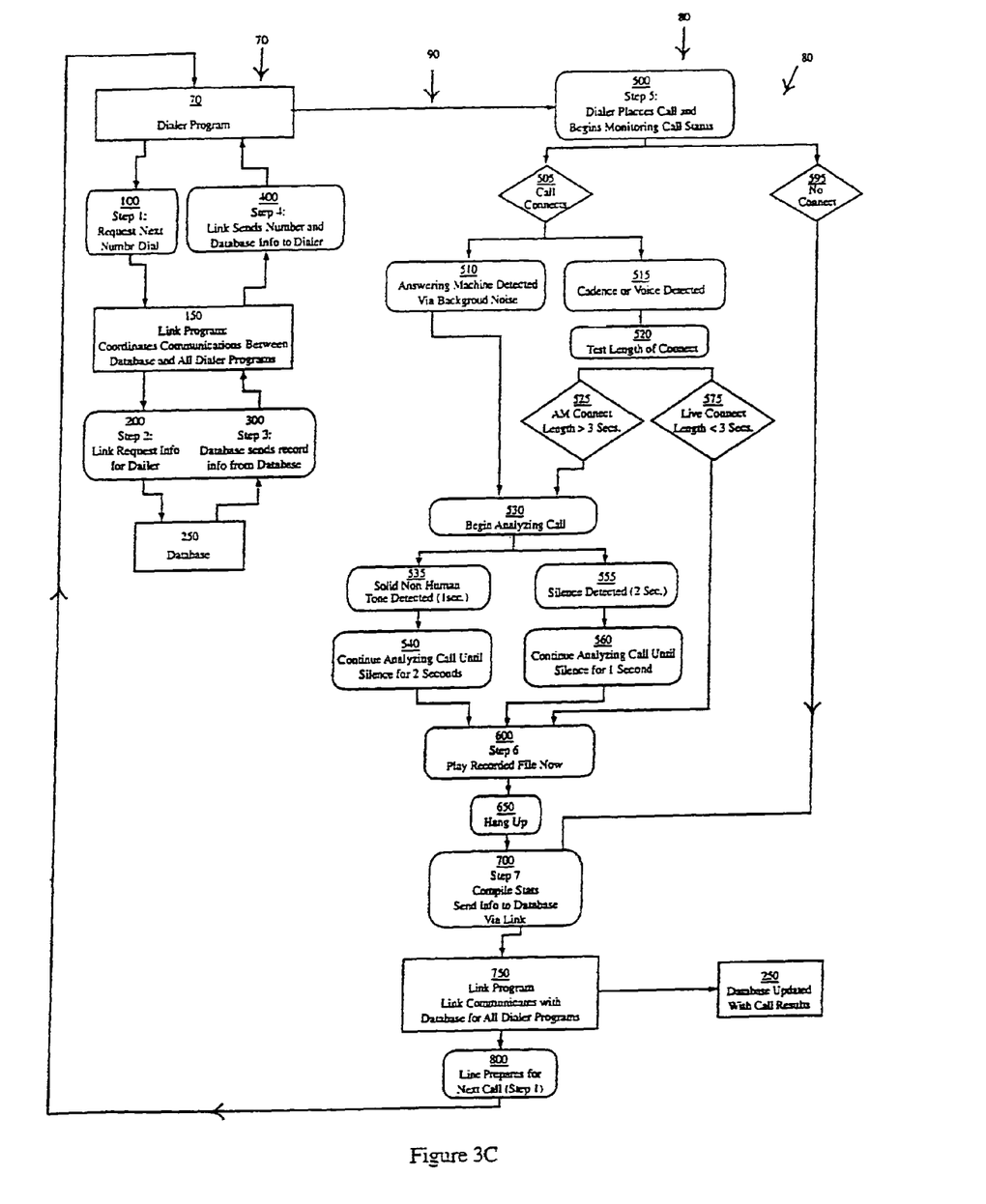
FIG. 3C is an overview of the entire flowchart process of the novel telephone dialing software message delivery system invention of FIGS. 2 and 3A-3B.

FIG. 3A is a flowchart 70 of the dialer program portion steps 1-4 of FIG. 2 of the novel telephone dialing software message delivery system invention. FIG. 3B is a flowchart 80 of the dialer placing call and monitoring portion Steps 5-7 of FIG. 2 of the novel telephone dialing software message delivery system invention, and will be explained in greater detail later. FIG. 3C is an overview of the entire flowchart process 90 of the novel telephone dialing software message delivery system invention of FIGS. 2 and 3A-3B. The steps of FIGS. 3A-3C, are covered in further detail in U.S. application Ser. No. 09/124,697 to the same assignee and same inventor as the subject invention, which is incorporated by reference.

Referring to FIGS. 3A and 3C, the dialer program 70 initiates the first Step 100 of FIG. 2. which requests the next telephone number to dial and uses the Link program 150 to communicate to the second Step 200 which is the link request for information for the Dialer from the database 250. Third Step 300 has the Database 250 send record information to the Link program 150 to the fourth Step 400 which is a link process that sends the telephone and Database information from the Link program to the Dialer program 70 and to the flowchart shown in FIG. 3B. When the Dialer program 70 requests a new number to call, the Link program 150 sends the Dialer program 70 the following bits of data: a telephone number, the name of the recorded messages(s) to play once connected, and the unique number of the record. When the Dialer program 70 has completed a call it sends to the Link program 150 the following: record number of completed call, call length and the results of the call. The first five Steps 100, 200, 300, 400 and 500 of FIGS. 3A-3C take place in the main computer system 10 of FIG. 1.

FIG. 3B is a flowchart 80 of the dialer placing call and the novel monitoring portion Steps 5-7 of the telephone dialing software message delivery system invention of FIG. 2. FIG. 3C is an overview of the entire flowchart process 90 of the novel telephone dialing software message delivery system invention of FIGS. 2 and 3A-3B. Referring to FIGS. 3B-3C, the fifth Step 500 of FIG. 2 by line 76 the telephone number and database information from the dialer program 70 and a dialer places the call and begins monitoring the call status and sends information 6 to database 250 via link 150 and the line 800 prepares for the next call back to first Step 100.

Referring back FIGS. 3B and 3C. if a call connects either path 510 or 515 occurs which will now be explained in detail. Under 510 an answering machine can be detected via background noise. See U.S. Pat. No. 5,371,787 to Hamilton, which is incorporated by reference. The CT hardware (20 of FIG. 1) can detect an answering machine by analyzing the frequency of the background noise present in the called party's voice response and compares it to a profile of the background noise typical of recorded messages. If the hardware 20 determines the presence of an answering machine in this manner, or in any other manner proprietary to the specific CT hardware, it communicates this information to the novel system(via the Custom control software) and the novel part of the Dialer program 70 responds. If the hardware 20 does not detect an answering machine via its built in detection, then the software in the Dialer program 70 determines whether the call is connected to a live person or an answering machine by analyzing the length (time) of the cadence of the voice which answered the telephone. The typical voice cadence of a live person is much shorter than that of an answering machine. For example a live person answers the telephone generally in one of the following ways: "Hello?" (followed by silence), "Hello, Smith Residence" (followed by silence), "ABC Enterprises . . . how can I direct your call?" (followed by silence). In all of these cases, the spoken words occur for a very brief period of time (less than three seconds), followed by a period of silence. In the case of a typical answering machine, the length of continuous human sound prior to a period of silence is much greater. An example of a typical answering machine message is "Thank you for calling the Smith Residence, we're not home right now, but if you leave a message after the tone we will call you back as soon as we can. Thank you for calling, and have a great day" (followed by silence). After analyzing the cadence the RealCall invention will have determined whether the call has reached an answering machine or reached a live person. The novel software system will then proceed to take the appropriate action.

From the answering machine substep 510 shown in FIGS. 3B and 3C, the next substep is to begin analyzing the call 530. From analyzing call substep 530, ether a solid non human tone of minimum duration of one second is detected substep 535 or silence, lasting 2 seconds is detected in substep 555.

Substeps 535 and 555 encompass an important part of the subject invention. In order to have reached step 530, the system must have determined it has reached an answering machine. The invention now must try to determine the appropriate time to launch the prerecorded message. To 'analyze' the call, the invention begins to RECORD the answering machine. The novel program only has instructions to stop recording under two conditions: (1) if it "hears" the presence of a solid, non human tone lasting at last one second in length (substep 535), or (2) it hears no sound for at least two continuous seconds (substep 555). A solid non human tone (substep 535) would be typical of a "BEEP" indicating that machines readiness to begin recording. However, since many answering machines play "BEEP" tones lasting less than one second, the two seconds of silence (substep 540) will act as a safety measure to insure that playback begins if the novel software does not recognize the "BEEP" indicator(substeps 540 and 560). Additionally, many answering machines play a succession of "beeps" to indicate the number of unplayed messages currently residing on the system. The $2^{nd}$ stage of continued analysis (substep 540) insures that the recording does not begin while the answering machine is still playing a series of "beep" tones.

During testing of the—invention, simply identifying a "BEEP" (535) or two seconds of silence (555) did not indicate the moment when the answering machine begins recording with any high degree of accuracy. The reasons for the inaccuracy stems from many factors including:

(1) machines which play multiple "BEEPS" before recording starts, (2) machines which play on-hold music (solid, non human tones) while preparing to record, (3) Outgoing messages (OGMs) which contain periods of silence after the end of the messages but prior to the announcing of a "beep" tone indicating the start of recording (this usually is the result of the owner of the answering machine who records their OGM and then cannot stop the recording immediately after recording their script).

In order to obtain a higher degree of accuracy as to the moment recording begins, the invention uses dual alternative two step tiers, which has been described in detail in parent U.S. application Ser. No. 09/124,697 by the same assignee and same applicant as the subject invention which is incorporated by reference. If the system had previously identified an initial "BEEP" (solid non-human noise (step 535)), the invention then begins re-recording the call. this time with instructions to end recording only after a period of two continual seconds of silence (substep 540). This logic believes that a "BEEP" or the playing of music has already occurred, and now the system is searching for the indication of recording, which will be evidence by silence Consequently, if the first tier analysis terminated for the presence of two seconds of silence (substep 555), the second tier analysis will simply test for another period of at least one second of additional silence (substep 560) before launching. In this situation, the second tier search for additional silence eliminates false recording detection in situations where an OGM plays a period of silence prior to playing a "BEEP". Testing of the RealCall invention has determined that adding the second tier of analysis has increased overall accuracy in determining the proper moment to begin playback by over 75% over current systems described in the prior art section of this invention.

As mentioned above, from substep 535 (in FIGS. 3B and 3C), the system continues analyzing call until silence for 2 seconds substep 540. After which from substep 540, the sixth Step 600 occurs where the system plays the recorded information file message, followed by the system disconnects the call substep 650 and the seventh Step 700 where the system compiles Call Stats and sends information to database 250 via the Link program 150 and substep 800 which prepares the system for the next telephone number and the first Step 100.

As previously mentioned, the other path from Begin Analyzing Call substep 530, is if silence is detected (2sec) 555. From substep 555, the next substep is to Continue Analyzing Call Until Silence for 1 seconds, substep 560. From substep 560, the sixth Step 600 has the system play the recorded information file, followed by the system disconnect substep 650 and the seventh Step 700 where the system compiles Call Stats(previously described) and sends the Stats information to database 250 via Link program 150 and substep 800 which prepares the system for the next telephone number and the first Step 100.

Referring to FIGS. 3B-3C, the Call Connects 505 passes through substep 515 when cadence or voice is detected. Next the system tests the length of the connect, substep 520. If an AM (answering machine) Connect is indicated by a cadence length greater than 3 seconds, substep 525, then the system begins analyzing the call to determine the appropriate time to play the message, substep 530, and the substeps 535 and 555 are checked as previously described. AM connect refers to Answering Machine Connect, or a call which has connected to an answering machine, as opposed to calls which are connected to live persons.

Figure 4:
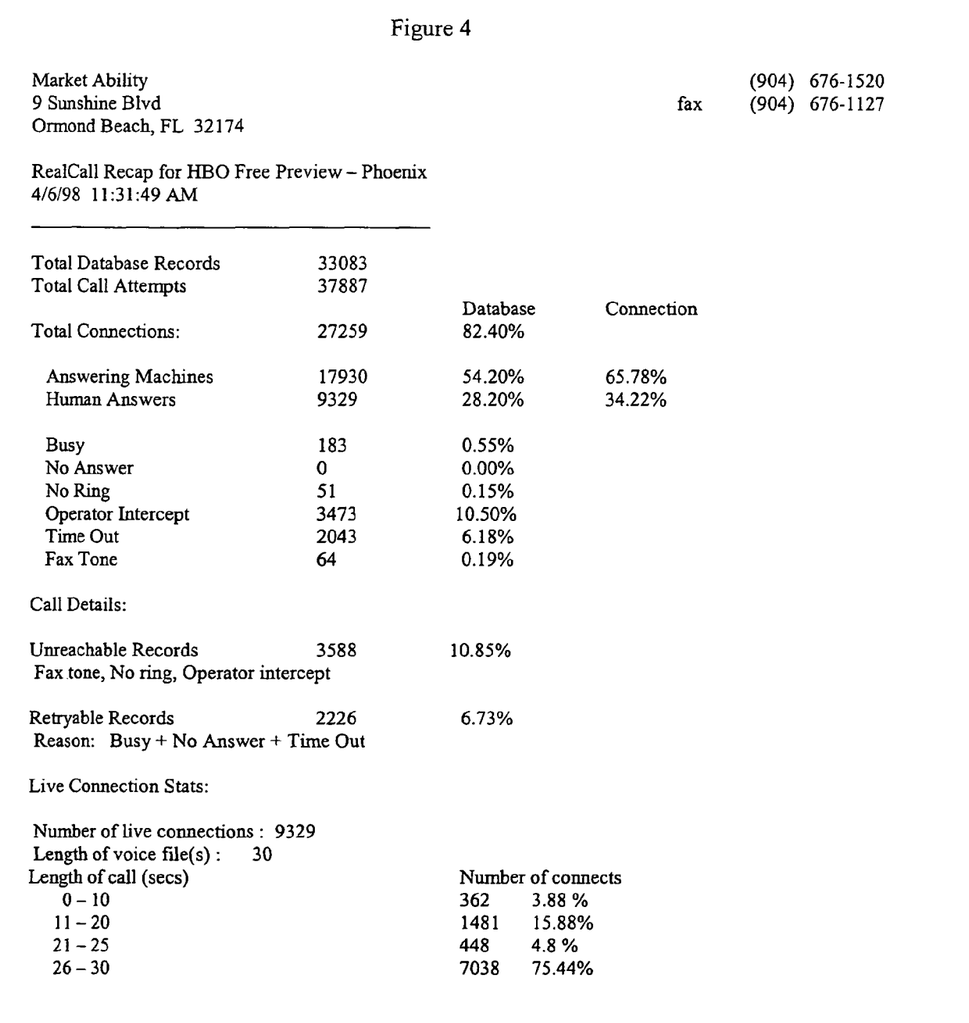
FIG. 4 shows an exemplary output Recap form of the invention.

Referring to FIGS. 3B-3C, if the test length of connect identifies a Live Connect as indicated by cadence length of less than 3 seconds substep 575, then the system goes to the sixth Step 600 where the system plays the recorded information message immediately and so forth as previously described. FIG. 4 shows an exemplary output Recap form of the invention

EMBODIMENT OF ECHO CANCELLATION

Figure 5A:
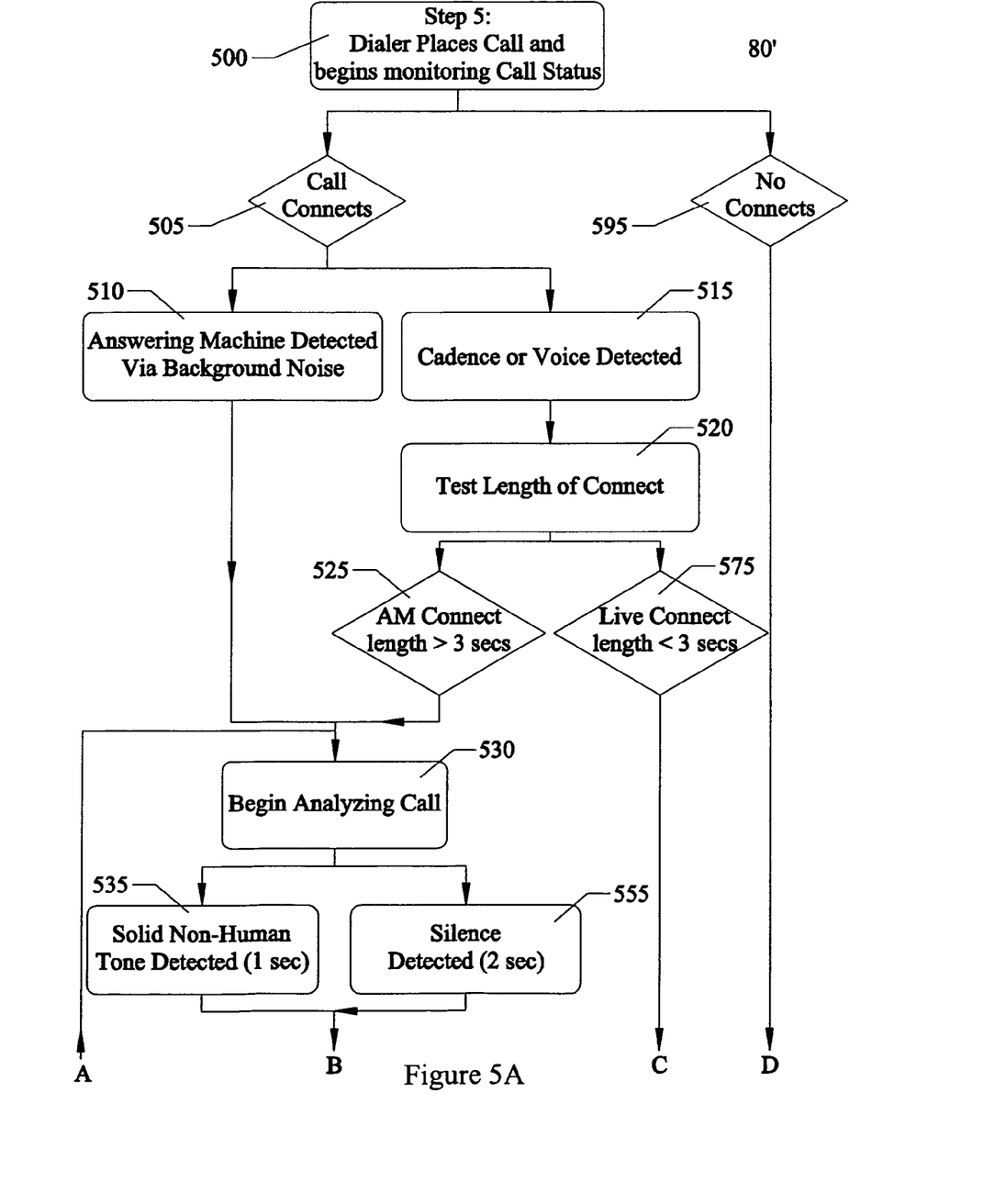
FIG. 5A, 5B, 5C is a second embodiment flowchart of the dialer placing call and monitoring portion steps 5-7 of the message delivery system invention of FIG. 2 for echo cancellation.
Figure 5B:
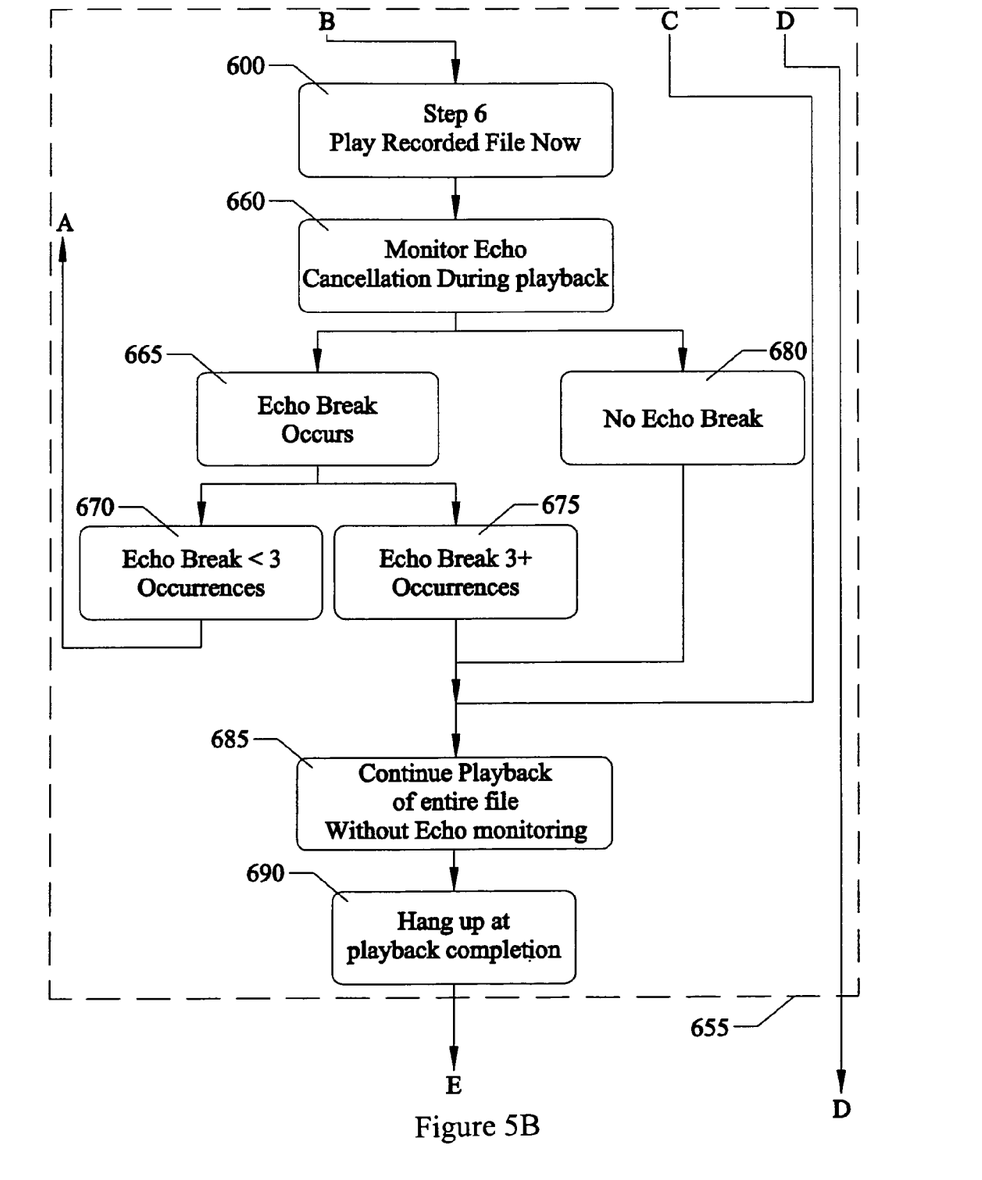
Figure 5C:
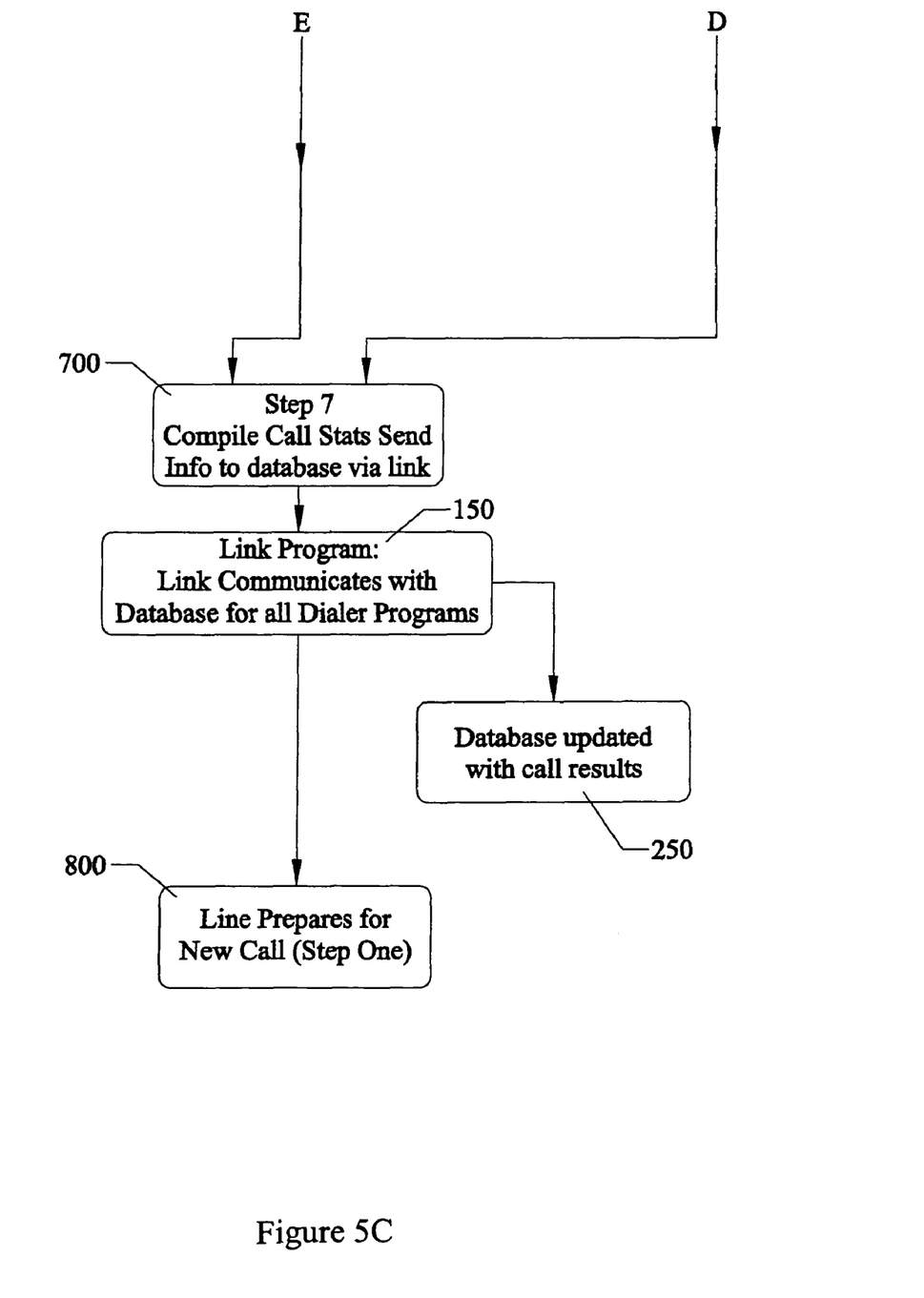

FIG. 5 is a second embodiment flowchart 80' of the dialer placing call and monitoring portion steps 5-7 of the message delivery system invention of FIG. 2 for echo cancellation. FIG. 5 shows an alternative embodiment specifically modifying step 6(600) of FIG. 3B. In FIG. 5 an alternative Step 6(655) is used. In the novel Echo Cancellation version, the term "echo" can be described as the sound one hears in the phone earpiece while the same person is speaking during a two way telephone conversation. As humans, we are capable of speaking and listening simultaneously (i.e. carrying on a "duplex" conversation). Therefore, humans can react to input from the other party to our conversation during a call. The novel "echo cancellation" embodiment can be described as the interference of the "echo" made by one's voice in one's earpiece caused by sound being transmitted to one's earpiece by the called party.

Former Step 6 (600) shown and described in reference to FIGS. 3B-3C, does not implement duplex capability. Therefore previous Step 6 (600) can either be listening (i.e. recording) or speaking (i.e. playing a file) at any given time but cannot be doing both listening and speaking at the same time (simultaneously). The first preferred embodiment described above accomplishes the task of determining the exact moment to play a recorded message using a two tiered method so that the message is recorded completely by the receiving answering machine. In the first preferred embodiment, the system needs to be completely certain as to the moment to begin playing the recorded message (file). because once playback begins, the system has no way to confirm the accuracy of the decision to launch the recorded message. The second preferred embodiment using echo cancellation monitoring is capable of "listening" to the recipient answering machine while the recorded message was being played. The second embodiment is less concerned with its accuracy in determining the exact time of launching. In the second embodiment the message delivery can be restarted (started over) if an "echo cancellation" occurred during the playback. The echo cancellation would be an indication to the system that there was still voice activity emanating from the answering machine. Thus, sound emanating from the answering machine during this first playback means that the first decision to launch a message was premature.

The second preferred embodiment of FIG. 5 uses a different plural step approach after determining an answering machine has been reached. Starting with the analyzing call substep 530, either a solid non human tone of minimum duration 1 second is detected substep 535 or silence, lasting 2 seconds, is detected in substep 555. In FIG. 5, substeps 535, 555, 600, 660, 665, 670, 675, 680 encompass the heart of the subject invention. In order to have reached step 530, the system must have determined it has reached an answering machine. The invention now must try to determine the appropriate time to launch the prerecorded message. To 'analyze' the call, the invention begins to RECORD (listen to) the answering machine. The novel program has instructions to stop recording under two conditions here: (1) if it "hears" the presence of a solid, non human tone lasting at least one second in length (substep 535), or (2) it hears no sound for at least two continuous seconds (substep 555). A solid non human tone (substep 535) would be typical of a "BEEP" indicating that machines readiness to begin recording. However, since many answering machines play "BEEP" tones lasting less than one second, the two seconds of silence (substep 555) will act as a safety measure to insure that playback begins if the novel software does not recognize the "BEEP" indicator(substeps 535). Additionally, many answering machines play a succession of "beeps" to indicate the number of unplayed messages currently residing on the system. The $2^{nd}$ stage of continued analysis (substep 555) insures that the recording does not begin while the answering machine is still playing a series of "beep" tones During testing of the invention, simply identifying. a "BEEP" (535) or two seconds of silence (555) did not indicate the moment when the answering machine begins recording with any high degree of accuracy. The reasons for the inaccuracy stems from many factors including: (1) machines which play multiple "BEEPS" before recording starts, (2) machines which play on-hold music (solid, non human tones) while preparing to record (3) Outgoing messages (OGMs) which contain periods of silence after the end of the messages but prior to the announcing of a "beep" tone indicating the start of recording (this usually is the result of the owner of the answering machine who records their OGM and then cannot stop the recording immediately after recording their script).

In order to obtain a higher degree of accuracy as to the correct moment for launching of the recorded file, the second embodiment skips the original step of confirming the answering machines status by listening for additional silence on the line, and instead begins playing the recorded file (step 600) immediately while simultaneously monitoring (listening) for any evidence of echo cancellation (step 660). If the system had previously identified an initial "BEEP" (solid non-human noise (step 535)) that lasts for one (1) second, or the system identified silence of approximately two seconds, then the system passes to step 600 and begins to play the recorded file immediately (plays the recorded message onto the answering machine. Once the system begins to play the recorded file (step 600), the system begins to monitor(step 660) any echo cancellation that occurs during the initial 10 seconds of playback of the recorded file(step 600). As previously explained echo cancellation refers to any sound emanating from the answering machine beyond the echo of the prerecorded message being played by the call delivery system.

Referring to FIG. 5, the first leg of the monitoring step 660 passes to step 665 if an echo break occurs (step 665). An echo break would be a "sound" emanating from the answering machine. An echo break would indicate that the initial launch of the recorded file (step 600) was premature. The first two times an echo break occurs during playback the system would simply reset itself (step 670) by passing back to step 530 to begin analyzing the call again. Each time the system "restarts" the monitoring process as a result of "hearing" a sound on the telephone line (step 670), the system would update a counter of retries undertaken as the result of echo cancellation occurrences (echo breaks). If echo breaks occur more than 2 times the system would continue playback of the entire message without further echo monitoring and hang up at the playback completion. This would eliminate the possibility of the system restarting the playback repeatedly because of anomalies in the telephone line connection that might cause the echo cancellation features to incorrectly detect sounds that did not in fact emanate from the answering machine (such as extreme noise over the telephone line due to storms or other telephone network conditions).

If an echo break of three (3) plus occurrences occurs then the system continues to playback the entire file without anymore echo cancellation monitoring(step 685), followed by the system hanging up substep 690 and the seventh Step 700 where the system compiles Call Stats and sends information to database 250 via the Link program 150 and substep 800 which prepares the system for the next telephone number and the first Step 100.

The second leg of the monitoring step 660 passes to step 680 when there are no echo breaks (no sounds emanating from the answering machine being monitored) during the initial 10 seconds of echo cancellation testing. If no echo cancellation sounds are being detected then the system continues to playback the entire file without any additional echo cancellation monitoring (step 685), followed by the system hanging up substep 690 and the seventh Step 700 where the system compiles Call Stats and sends information to database 250 via link program 150 and substep 800 which prepares the system for the next telephone number and the first Step 100. The remaining steps are similar to those described in reference to the first embodiment previously described.

The length of time for monitoring the echo cancellation can be selected by the user to be any length of time up to the entire length of the recorded message. The inventor has chosen a 10 second period for monitoring the echo cancellation for several reasons: First, studies have indicated that the majority of answering machine OGMs last for approximately 7 to 10 seconds, therefore the combination of 2 (two) 10 second intervals (one 10 second interval for each of two possible echo cancellation monitoring sessions) will extend safely beyond the time frame under which the vast majority of potential misdiagnoses of launch conditions will have transpired. Secondly, many answering machine devices have the ability to allow their user to "screen" calls by listening to the messages being recorded in real time, while allowing the user to pick up the telephone and receive the telephone call while interrupting the answering machine's recording process. If the user were to pick up the telephone call during the first 10 seconds of playing of the recorded message (during echo cancellation monitoring) the system would reset itself and begin playing the message again from the beginning of the message. This feature would be advantageous in that the live call recipient would be able to hear the message again in its entirety. However, assuming a 10 second setting for monitoring echo cancellations, if the message had played through the first ten seconds the system would not reset upon the caller picking up the line, and would instead continue playing uninterrupted to it's conclusion. This feature is a fail safe to avoid situations where the recorded message playback would have played to within a few seconds of completion only to be restarted because of a live pickup of the line or a misdiagnoses of line noise caused by poor line conditions or similar telephone system problems would cause the system to restart multiple times during playback.

Utilizing the echo cancellation embodiment would potentially result in messages being left with less delay time from the start of recording till the launch of a recorded message. The initial message launch determination in this embodiment would not be as accurate as that described in the first preferred embodiment. In the second embodiment, more messages would be launched earlier than in the first embodiment. However, this would not be a problem, since the novel echo cancellation monitoring features would recognize errors in identifying the start of answering machine recording and would be able to deliver messaged closer to the start time of when the answering machine begins recording.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An automated two tiered method of delivering a message via a telephone dialing system to an automated recorder while monitoring for echo cancellation break signals, comprising the steps of:

(a)(i) placing a telephone call to a telephone number that is associated with an answering machine, the telephone number being selected from a database of telephone numbers;

(a)(ii) detecting a signal being emitted from the answering machine;

(a)(iii) alternatively determining if the detected signal is either a continuous noise signal tone over a first time period or is a period of silence over a second time period, the first time period being different from the second time period;

(b)(i) playing a recorded information message onto the answering machine after a third time period following the first time period of the continuous noise signal tone;

(b)(ii) playing the recorded information message onto the answering machine after a fourth time period following the second time period of the period of silence;

(c) monitoring the answering machine for echo cancellation break signals while simultaneously playing the recorded message;

(d) repeating steps (a)(i), (a)(ii), (b)(i),(b)(ii) and (c) for less than three echo cancellation break signals; and (e) continuing to play the recorded message if there are either no echo cancellation break signals or there are at least three echo cancellation break signals, wherein the method overcomes problems with premature launching of the recorded message so that the recorded message is launched closer to the time when the answering machine begins recording, and the recorded message is delivered in a nontruncated form by the answering machine; and (f) repeating the above steps until at least a pass through of all the telephone numbers from the database have been called.

2. The automated method of delivering the recorded information message of claim 1, wherein the echo cancellation signals includes:
sounds being emitted from the answering machine.

3. The automated method of delivering the recorded information message of claim 1, wherein step(d) further includes:
repeating step(b)(i) and (b)(ii) for less than three sound occurrences.

4. The automated method of delivering the recorded information message of claim 1, wherein step(e) further includes:
continuing to play the recorded message if there are at least three echo cancellation break signals.

5. The automated method of delivering the recorded information message of claim 1, further comprising the steps of:
(f) removing echo signal monitoring and continuing to play the recorded message to completion.

6. The automated system for delivering recorded information messages of claim 1, wherein the answering machine of step(a) is chosen from one of:
a tape machine, a digital machine, a pager, a telephone provider voice/memory call machine, and a cellular machine.

7. The method of claim 1, wherein the selected time period of the solid tone emission is approximately one second.

8. The method of claim 1, wherein the first selected time period is approximately one second, and the second selected time period is approximately two seconds.

9. An automated two tiered method of delivering a recorded information message to an automated recorder while monitoring for echo cancellation break signals, comprising the steps of:

(a)(i) placing a telephone call to an answering machine;

(a)(ii) alternatively detecting for both a continuous solid tone being emitted from the answering machine over a first time period, or for a silence response from the answering machine over a second time period, wherein the first time period is different from the second time period;

(b)(i) playing the recorded information message onto the answering machine, following a third time period from the first time period of the continuous solid tone;

(b)(ii) playing a recorded information message onto the answering machine, following a fourth time period from the second time period of the silence response;

(c) monitoring the answering machine for echo cancellation break signals while simultaneously playing the recorded message;

(d) repeating steps (a)(i), (a)(ii), (b)(i), (b)(ii) and (c) for less than three echo cancellation signals; and (e) continuing to play the recorded message if there are either no echo cancellation break signals or there are at least three echo cancellation break signals, wherein the method overcomes problems with premature launching of the recorded message so that the recorded message is launched closer to the time when the answering machine begins recording, and the recorded message is delivered in a nontruncated form by the answering machine.

10. The method of claim 9, wherein the first time period of the solid tone emission is approximately one second and the second time period for the silent response is approximately two seconds.

11. The method of claim 9, further comprising the step of:
(a)(iii) detecting for a subsequent silence response over a subsequent time period after expiration of the first time period for the detection of the solid tone emission from the answering machine, the subsequent time period being different from the first time period.

12. The method of claim 9, wherein the first time period is approximately one second, and the subsequent time period is approximately two seconds.

13. The method of claim 8, further comprising the step of
(a)(iii) detecting for a subsequent silence response over a subsequent time period after expiration of the second time period for the detection of the silence response from the answering machine, the subsequent time period being different from the second time period.

14. The method of claim 9, wherein the second time period is approximately two seconds and the subsequent time period is approximately one second.

15. The method of claim 9, further comprising the steps of:
(a)(iii) detecting for a first subsequent silence response over a first subsequent time period after expiration of the first time period for the detection of the solid tone emission from the answering machine, the first subsequent time period being different from the first time period; and
detecting for a second subsequent silence response over a second subsequent time period after expiration of the second time period for the detection of the silence response from the answering machine, the second subsequent time period being different from the second time period.

16. The method of claim 9, wherein the first time period is approximately one second and the second time period is approximately two seconds.

17. The method of claim 9, wherein the first time period is approximately two seconds, and the second time period is approximately one second.

18. An automated two tiered system for delivering a recorded messages to answering machines while monitoring for echo cancellation break signals, comprising:
an automated dialer for placing a telephone call to an answering machine;
an alternating detector for alternatively detecting for both a continuous solid tone being emitted from the answering machine over a first time period, or for detecting a silence response from the answering machine over a second time period, wherein the first time period is different from the second time period;

first player for playing a recorded information message onto the answering machine after a third time period following the first time period of the solid tone;

second player for playing the recorded information message onto the answering machine after a fourth time period following the second time period of the silence response;

a monitor for continuously monitoring the answering machine for echo cancellation break signals while simultaneously playing the recorded message from the first player a repeater for repeating said two tier system, said first from player, and said second player when there are less than three echo cancellation break signals; and from the second player; and a continuous player for continuing to play the recorded message if there are either no echo cancellation break signals or there are at least three echo cancellation break signals, wherein the system overcomes problems with premature launching of the recorded message so that the recorded message is launched closer to the time when the answering machine begins recording so the recorded message is delivered in a nontruncated form by the answering machine.

* * * * *